United States Patent [19]

Watanabe et al.

[11] Patent Number: 4,548,532
[45] Date of Patent: Oct. 22, 1985

[54] ATTACHMENTS FOR FITTING TOOLS TO SPINDLES

[75] Inventors: Koya Watanabe; Katuo Yamazaki, both of Numazu; Sadaji Hayama, Mishima, all of Japan

[73] Assignee: Toshiba Kikai Kabushiki Kaisha, Tokyo, Japan

[21] Appl. No.: 481,078

[22] Filed: Mar. 31, 1983

[30] Foreign Application Priority Data

Apr. 10, 1982 [JP] Japan ................... 57-52269

[51] Int. Cl.$^4$ ............................................. B23C 5/26
[52] U.S. Cl. ................................... 409/233; 279/1 A; 408/239 A
[58] Field of Search ............... 409/230–234, 409/215, 204; 408/239 A, 239 R, 238; 279/1 A

[56] References Cited

U.S. PATENT DOCUMENTS

| | | | |
|---|---|---|---|
| 3,587,389 | 6/1971 | Kreimer | 409/204 |
| 3,757,637 | 9/1973 | Eich et al. | 409/230 |
| 3,762,271 | 10/1973 | Poincenot | 409/223 |
| 4,238,167 | 12/1980 | Brugger et al. | 279/1 A X |
| 4,334,811 | 6/1982 | Trumpf et al. | 409/223 |

FOREIGN PATENT DOCUMENTS

| | | | |
|---|---|---|---|
| 551312 | 11/1956 | Italy | 408/238 |
| 1376 | 1/1978 | Japan | 408/239 A |
| 16976 | 2/1978 | Japan | 409/230 |
| 780986 | 11/1980 | U.S.S.R. | 409/232 |

Primary Examiner—William R. Briggs
Attorney, Agent, or Firm—Koda and Androlia

[57] ABSTRACT

An attachment for fitting a tool to a hollow spindle of a machine tool, in a case where a shank portion of the tool has a taper-size smaller than that of a tapered hole of the spindle, comprises a hollow attachment body to be secured to the lower end of a ram of the machine tool, a sleeve rotatably supported in the attachment body, and an arbor assembly disposed axially movably in the sleeve. The arbor assembly comprises a stud arbor, a pull-stud to be engaged with a collet chuck disposed in the spindle, and a collet chuck to be engaged with a pull-stud of the tool inserted into a tapered hole of the sleeve.

1 Claim, 1 Drawing Figure

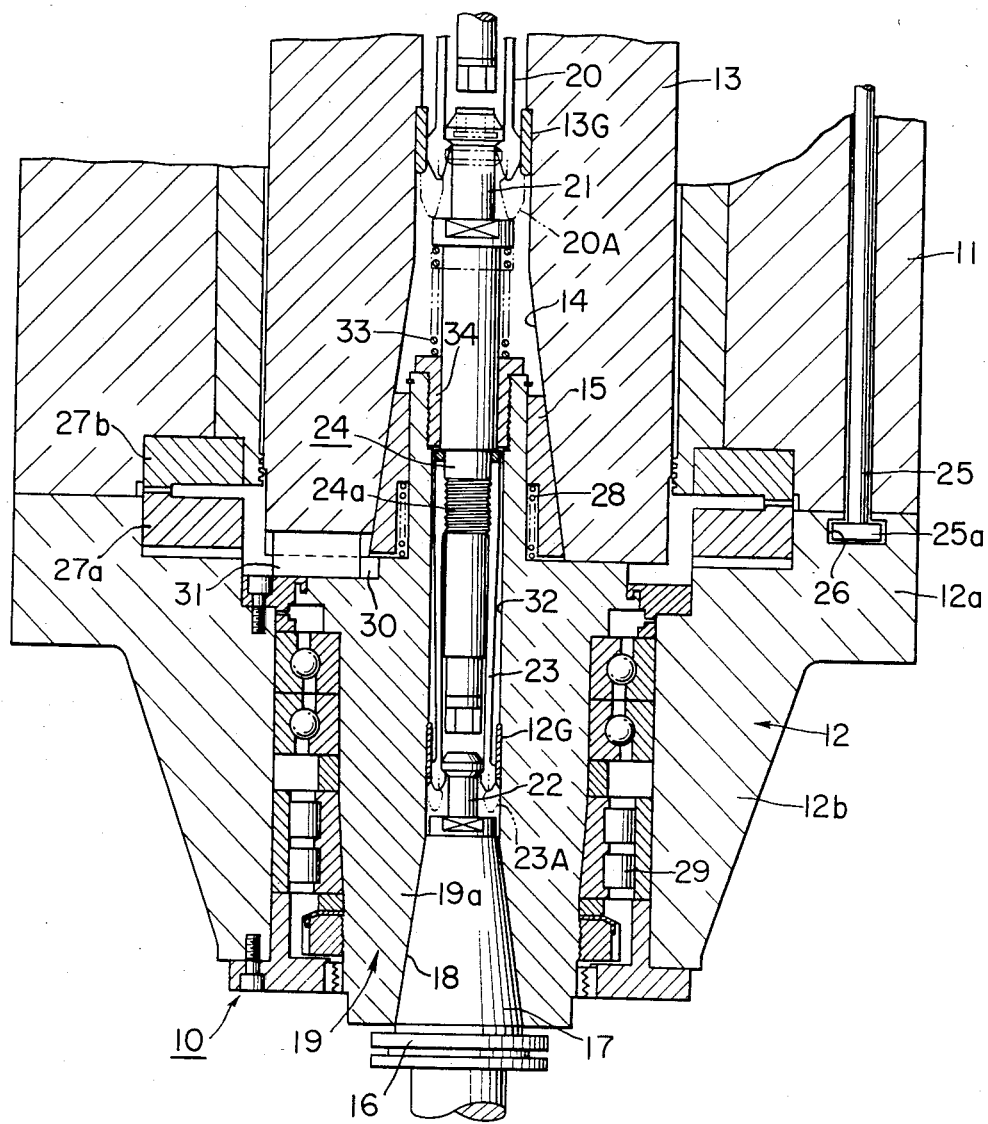

ATTACHMENTS FOR FITTING TOOLS TO SPINDLES

BACKGROUND OF THE INVENTION

This invention relates to an attachment for a spindle of a machine tool and, more particularly, to an attachment suitable for attaching to the spindle a tool provided with a tapered shank portion having a taper-size smaller than that of a corresponding tapered hole of the spindle.

A general method in prior art for fitting a tool to a spindle of a machine tool comprises the steps of inserting a tapered shank portion of the tool into a tapered hole provided for the spindle and clamping a pull-stud attached to the inserted end of the tool with a collet chuck disposed in the spindle.

In this method, when a tool provided with a tapered shank portion having a size, i.e., diameter, smaller than that of a tapered hole of the spindle is fitted to the spindle, there is used a tapered sleeve provided with a tapered member to be engaged with the tapered hole of the spindle and a tapered hole to be engaged with a tapered shank portion of the tool. The sleeve is secured to the lower end of the spindle by means of bolts to thereby fit the tool to the spindle.

However, it is required for the pull-stud of the tool to have a length considerably longer than that of a usual standard tool for clamping the pull-stud with the collet chuck of the spindle because the pull-stud has to have a length sufficient to extend through the interior of the sleeve to clamp it. In addition, it is troublesome work to secure the tapered sleeve to the lower end surface of the spindle by means of bolts. Moreover, the distance between the lower ends of the tool and the spindle is widely separated, so that the rigidity of the tool is lowered and the tool thus attached is not suitable for heavy cutting work.

SUMMARY OF THE INVENTION

An object of this invention is to obviate the defects of the prior art described above and to provide an attachment used for attaching a tool, to a spindle of a machine tool, having a tapered shank portion with a taper-size smaller than that of a tapered hole of the spindle to be engaged with.

Another object of this invention is to provide an attachment for the spindle of a machine tool provided with a sleeve through which a standard tool is attached to the spindle even in a case where the size of the shank portion of the tool is smaller than that of the corresponding hole provided for the spindle.

According to this invention there is provided an attachment adapted to fit a tool to a hollow spindle of a machine tool, which comprises a hollow attachment body to be secured to a lower end surface of a ram surrounding the spindle, a sleeve member rotatably fitted in an inner hollow portion of the attachment body and provided with a tapered member to be fitted into a tapered hole of the spindle, a tapered hole to be engaged with a tapered shank portion of the tool, and a through hole continuous and coaxial with the tapered hole of the sleeve, and an arbor assembly disposed axially movably in the through hole of the sleeve and adapted to secure the tool to the spindle of the machine tool.

BRIEF DESCRIPTION OF THE DRAWING

In the accompanying drawing the single FIGURE shows a vertical sectional view of an attachment according to this invention fitted to a spindle of a machine tool.

DESCRIPTION OF THE PREFERRED EMBODIMENT

Referring to the drawing, an attachment 10 for a spindle of a machine tool according to this invention comprises a body 12 to be secured to the lower end surface of a ram 11 of the machine tool, a sleeve 19 rotatably supported in and by the body 12, and an arbor assembly 24 arranged in the sleeve 19 to be movable axially. The sleeve 19 is provided with a tapered member 15 rotatably supported by the body 12 and adapted to be fitted into a tapered hole 14 of a spindle 13 of a machine tool and further provided with a main body 19a provided with a tapered hole 18 to receive a tapered shank portion 17 of a tool 16 when it is fitted. The arbor assembly 24 comprises a stud arbor 24a, a pull-stud 21 to be engaged with a collet chuck 20 fitted in the spindle 13 and a collet chuck 23 to be engaged with a pull-stud 22 of the inserted tool 16. The tool 16 in this specification is referred to a tool assembly including a tool holder.

The body 12 of the attachment 10 comprises a portion 12a which is attached to the lower end surface of the ram 11 and a housing 12b provided with a through hole for rotatably holding the sleeve 19. A T-shaped bolt 25 having a T-shaped front head 25a extends downwardly from the ram 11 into the body 12 of the attachment 10 and the T-shaped head 25a is received rotatably and movably in a T-shaped groove 26 formed in the portion 12a of the attachment body 12. The T-shaped bolt 25 is rotated and pulled upwardly by an automatic drive means, not shown, after the head 25a is inserted into the corresponding T-shaped groove 26 to thereby secure the body 12 of the attachment 10 to the lower end of the ram 11. The positioning of the body 12 of the attachment 10 with respect to the ram 11 can be achieved by the engagement of a coupling gear 27a secured to the portion 12b with a coupling gear 27b secured to the lower end of the ram 11.

The main body 19a of the sleeve 19 is rotatably supported by a bearing 29 mounted in the housing 12b of the attachment body 12 and at the upper end portion of the main body 19a is formed a notch 30 which is engaged with a projection 31 formed on the lower end of the spindle 13 so as to positively transmit the rotating force of the spindle 13 to the sleeve 19. The tapered member 15 of the sleeve 19 has a hollow conical configuration and is supported on the main body 19a of the sleeve 19 through a spring 28. The sleeve 19 is also provided with an inner through hole 32 which is continuous and coaxial with the tapered hole 18 of the sleeve 19, so that the stud arbor 24 can be inserted axially movably into the through hole 32. The pull-stud 21 of the arbor assembly 24 upwardly projects and is held in the spindle hole above a member 34 engaged with the top portion of the sleeve 19 through a spring 33 and the collet chuck 23 of the arbor assembly 24 is disposed in the through hole 32 at a position slightly above the tapered hole 18.

The attachment according to this invention is fitted into a spindle of a machine tool in the following manner.

In a case where it is required to fit to the spindle 13 the tool 16 provided with the tapered shank portion 17 having a taper-size smaller than that of the tapered hole 14 of the spindle 13 of a machine tool, the tapered shank portion 17 of the tool 16 is first inserted into the tapered hole 18 formed at the lower end of the sleeve 19 of the attachment 10. During the insertion thereof, the pull-stud 22 of the tool 16 is engaged with the collet chuck 23 of the arbor assembly 24 supported in the sleeve 19 and pulled backwardly (upwardly as viewed in the drawing) from a position 23A shown by a dotted line to a position 23B shown by a solid line to ride on a collet guide 12G, thus the pull-stud 22 being clamped by the collet chuck 23 and the tool 16 being secured to the attachment 10.

The attachment 10 provided with the tool 16 is thus attached is engaged with the ram 11 so that the upper portion 12b of the attachment body 12 will abut to the lower end surface of the ram 11 and the tapered member 15 will be inserted into the tapered hole 14 of the spindle 13. At this time, the pull-stud 21 of the arbor assembly 24 is forced into the collet chuck 20 and engaged therewith. The pull-stud 21 is then clamped by pulling upwardly the collet chuck 20 onto a collet guide 13G from a position shown by a dotted line 20A to a position shown by a solid line 20 in the drawing by using pulling means, not shown, disposed above the spindle. The body 12 of the attachment 10 is positioned by the engagement of the coupling gears 27a and 27b and secured to the ram 11 by the engagement of the T-shaped bolt 25 and the corresponding groove 26.

The spindle 13 is rotated after the tool has been secured to the spindle 13 and the rotation is transmitted to the sleeve 19, i.e. the tool 16, by the engagement of the notch 30 with the projection 31.

The removal of only the tool 16 can be performed by releasing the engagement between the pull-stud 22 and the collet chuck 23 and the removal of the attachment can be performed by disengaging the coupling gears 27a and 27b and the T-shaped bolt head 25a from the T-shaped groove 26.

In the foregoing, although an example was described in which the tool 16 is preliminarily fitted to the attachment 10 and then the attachment 10 is secured to the spindle 13, it is of course possible to first secure the attachment 10 to the spindle 13 and then fit the tool 16 to the attachment 10.

As described hereinabove, according to this invention, a standard tool provided with a tapered shank portion having a taper-size smaller than that of a tapered hole of a spindle can be fitted by using a specific attachment and without using a tool having a specific pull-stud. In addition, the sleeve member of the attachment can be rotatably firmly secured to the ram of the spindle, so that the tool can be rigidly supported by the spindle, whereby heavy cutting work as well as light cutting work can be performed satisfactory.

What is claimed is:

1. An attachment adapted to fit a tool to a hollow spindle of machine tool in which a shank portion of the tool has a taper size smaller than that of the taper hole of the spindle comprising:
   a hollow attachment body to be secured to a lower end surface of a ram surrounding the spindle;
   a sleeve member rotatably fitted in an inner hollow portion of said attachment body and provided with a tapered hole to be engaged with a tapered shank portion of said tool and a through hole continuous and coaxial with said tapered hole of said sleeve member, said sleeve member being provided with an end portion extending into a hollow portion of said hollow attachment body;
   a tapered member having a hollow conical configuration disposed on a shoulder portion formed at one end of said sleeve member so as to surround said extending portion of said sleeve member;
   a first spring means disposed on said shoulder portion so as to outwardly urge said tapered member into the tapered hole of said attachment body;
   a threaded member threaded into said end portion of said sleeve, said threaded member having a through hole corresponding to said through hole in said sleeve;
   an arbor assembly disposed in said through hole of said sleeve member, said through hole in said threaded member and said hollow member of said attachment body and adapted to secure the tool to the spindle of the machine tool, said arbor assembly comprising a stud arbor, a pull-stud provided at one end of said arbor assembly in said hollow portion of the attachment body to be engaged with a collet chuck axially movably supported on said spindle and a collet chuck provided at the other end of said arbor assembly to be engaged with a pull-stud of the tool inserted into said sleeve member, said pull-stud of said arbor assembly being held in the hollow portion of said attachment body of the spindle; and
   a spring means provided in said hollow portion of said hollow attachment body and engaging at one end of said pull-stud and engaging at the other end of said threaded member so as to outwardly urge said pull-stud of said arbor assembly whereby said pull-stud of said arbor assembly is held in the hollow portion of said attachment body of the spindle.

* * * * *